(12) United States Patent
Siebenaler et al.

(10) Patent No.: US 12,007,119 B2
(45) Date of Patent: Jun. 11, 2024

(54) GRILL CLEANING TOOL ASSEMBLY (71) Applicants: John Siebenaler, Emporia, KS (US); Lori Siebenaler, Emporia, KS (US)

(72) Inventors: John Siebenaler, Emporia, KS (US); Lori Siebenaler, Emporia, KS (US)

( * ) Notice: Subject to any disclaimer, the term of this patent is extended or adjusted under 35 U.S.C. 154(b) by 600 days.

(21) Appl. No.: 17/323,378

(22) Filed: May 18, 2021

(65) Prior Publication Data
US 2022/0373185 A1 Nov. 24, 2022

(51) Int. Cl.
F24B 13/00 (2006.01)
A47J 37/07 (2006.01)
F24B 15/06 (2006.01)

(52) U.S. Cl.
CPC .......... *F24B 15/06* (2013.01); *A47J 37/0786* (2013.01); *F24B 13/006* (2013.01)

(58) Field of Classification Search
CPC ........ F24B 15/06; F24B 15/08; F24B 13/006; F24B 13/008; A47J 37/0786
USPC ...................................... 294/9, 10, 176, 180
See application file for complete search history.

(56) References Cited

U.S. PATENT DOCUMENTS

| 268,452 | A | * | 12/1882 | Borst | |
|---|---|---|---|---|---|
| 741,640 | A | * | 10/1903 | Ernst | |
| 904,756 | A | | 11/1908 | Clement | |
| 1,554,525 | A | * | 9/1925 | Ricci | F24B 15/08 |
| | | | | | 209/419 |
| 1,762,347 | A | | 6/1930 | Peebles | |
| 2,299,418 | A | * | 10/1942 | Thomas | E04D 13/0765 |
| | | | | | 294/51 |
| 2,637,588 | A | | 5/1953 | Burke | |
| 2,666,309 | A | * | 1/1954 | Anderson | A47L 13/52 |
| | | | | | 15/257.7 |
| 3,107,467 | A | * | 10/1963 | Gates | G07D 9/002 |
| | | | | | 294/51 |
| D200,970 | S | * | 4/1965 | Miller | 294/176 |
| 6,000,739 | A | | 12/1999 | Zemit | |
| 6,575,511 | B2 | * | 6/2003 | Hultstrand | B60S 3/045 |
| | | | | | 294/51 |
| 8,740,269 | B2 | | 6/2014 | Greer | |
| 9,781,871 | B2 | * | 10/2017 | Dick | B65B 39/08 |
| 2023/0380626 | A1 | * | 11/2023 | Lavins | A47J 37/0664 |

FOREIGN PATENT DOCUMENTS

CA 2104132 2/1995

* cited by examiner

Primary Examiner — Paul T Chin (57) ABSTRACT

A grill cleaning tool assembly for effectively cleaning rounded grills and smokers includes a curved ash scoop apparatus and a curved ash scraper apparatus. The curved ash scoop apparatus comprises a scoop back having an arcuate scoop back bottom edge conforming to the contour of a rounded grill or smoker. A scoop body is coupled to the scoop back and extends from a scoop back bottom edge perpendicular to a scoop back front side. A scoop handle is coupled to the scoop back back side. The curved ash scraper apparatus comprises a scraper blade having a blade front side, a blade back side, a blade top edge, and a blade bottom edge. The blade bottom edge is arcuate and conforms to the contour of the scoop back bottom edge. A scraper handle is coupled to the blade back side.

11 Claims, 8 Drawing Sheets

GRILL CLEANING TOOL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to grill cleaning devices and more particularly pertains to a new grill cleaning device for effectively cleaning rounded grills and smokers. The present device includes an ash scoop and an ash blade both with a rounded profile that conforms to the curvature of the grill. There is also a handled grill hook to easily lift the grate during cleaning.

(2) Description of Related Art Including Information Disclosed Under 37 CFR 1.97 and 1.98

The prior art relates to grill cleaning devices. Known devices include various scarpers and shovels. These devices typically have planar edges and are ineffective on curved surfaces. Known devices are also typically improperly sized to fit into smoker doors.

BRIEF SUMMARY OF THE INVENTION

An embodiment of the disclosure meets the needs presented above by generally comprising a curved ash scoop apparatus and a curved ash scraper apparatus. The curved ash scoop apparatus comprises a scoop back having a scoop back front side, a scoop back back side, a scoop back top edge, and a scoop back bottom edge. The scoop back bottom edge is arcuate and configured to conform to the contour of a rounded grill or smoker. A scoop body is coupled to the scoop back. The scoop body extends from the scoop back bottom edge perpendicular to the scoop back front side. A scoop handle is coupled to the scoop back. The scoop handle is coupled to the scoop back back side. The curved ash scraper apparatus comprises a scraper blade having a blade front side, a blade back side, a blade top edge, and a blade bottom edge. The blade bottom edge is arcuate and conforms to the contour of the scoop back bottom edge. A scraper handle is coupled to the scraper blade. The scraper handle is coupled to the blade back side.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
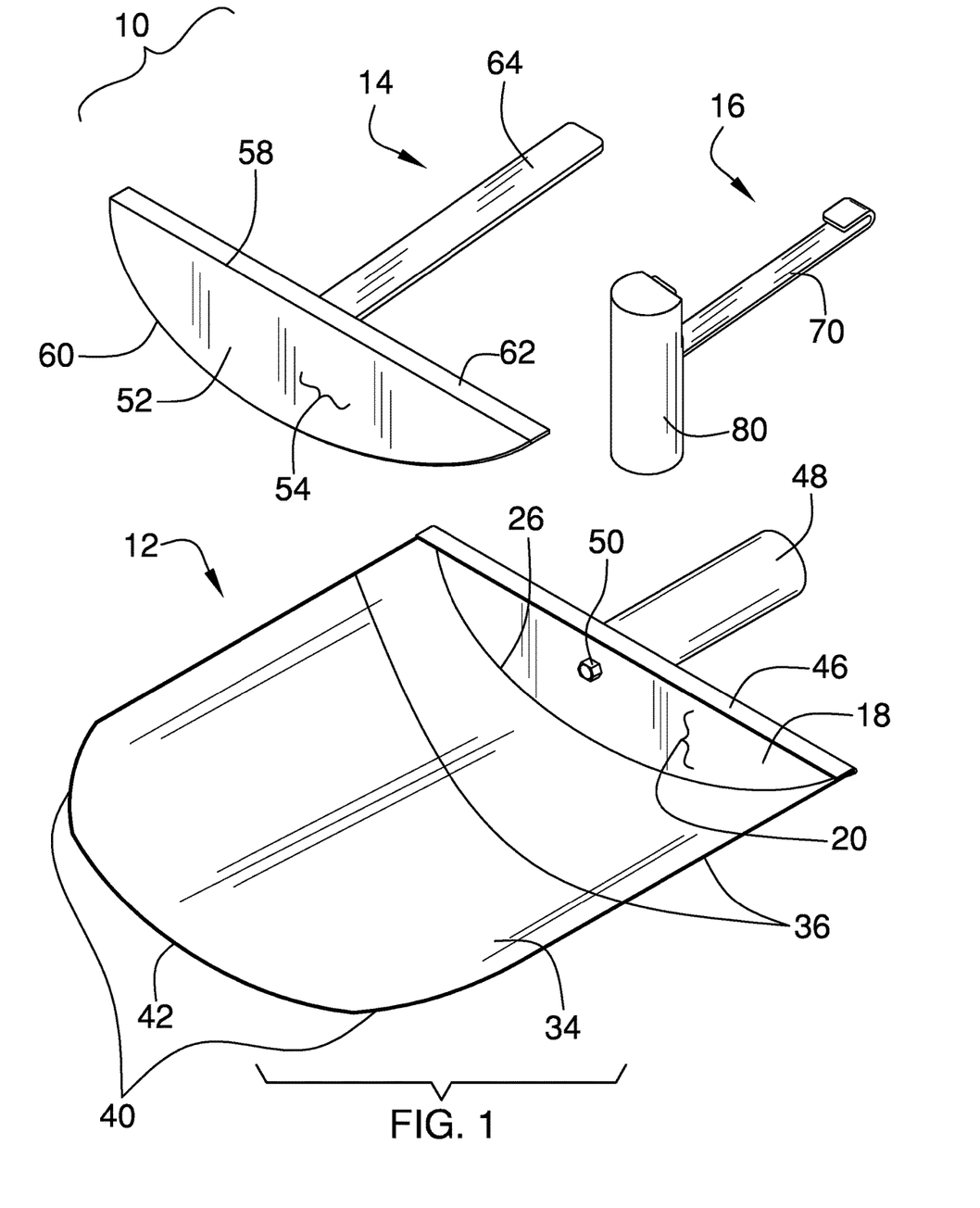
FIG. 1 is an isometric view of a grill cleaning tool assembly according to an embodiment of the disclosure.
Figure 2:
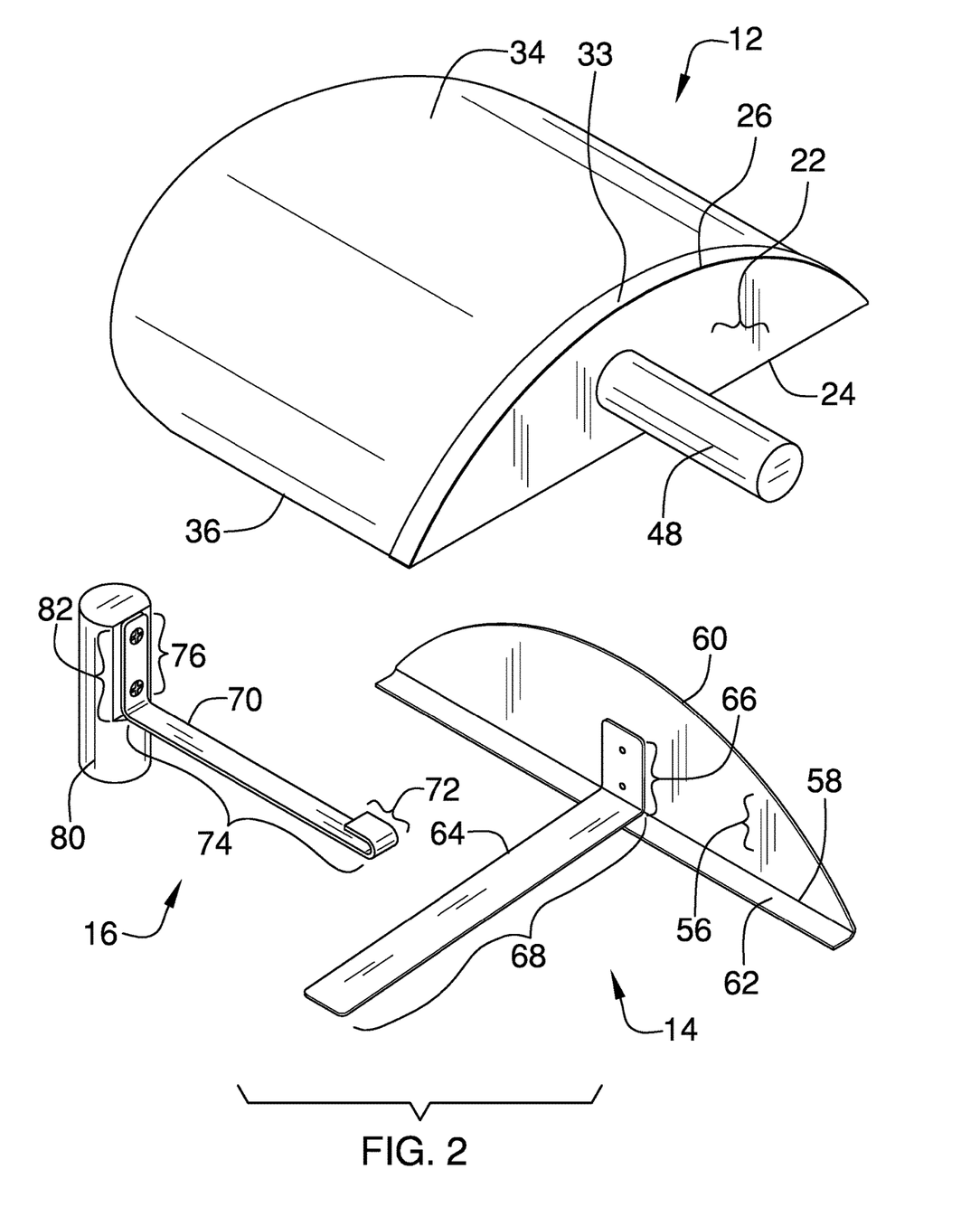
FIG. 2 is an isometric view of an embodiment of the disclosure.
Figure 3:
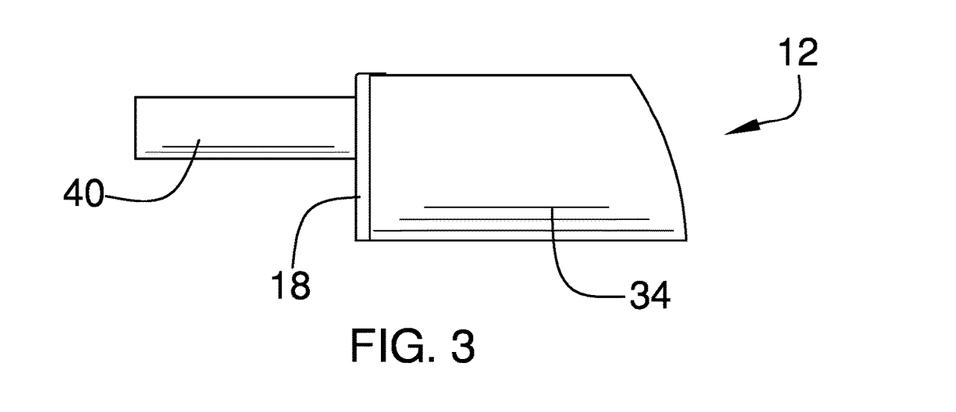
FIG. 3 is a side elevation view of an embodiment of the disclosure.
Figure 4:
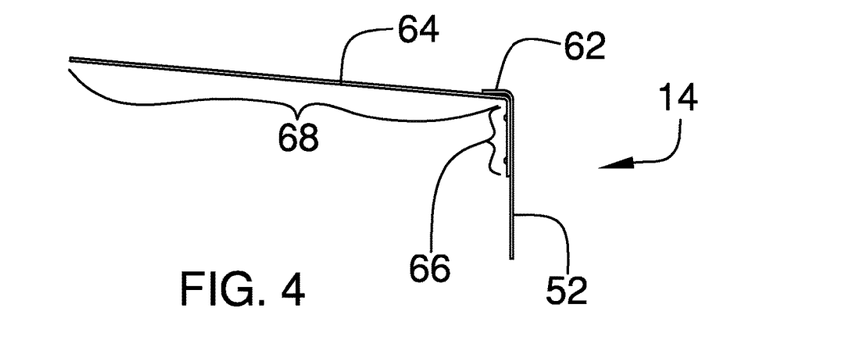
FIG. 4 is an isometric view of an embodiment of the disclosure.
Figure 5:
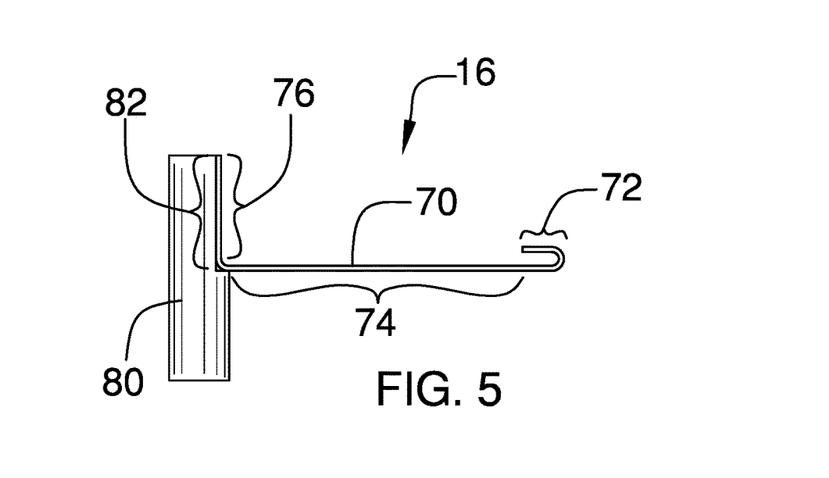
FIG. 5 is an in-use view of an embodiment of the disclosure.
Figure 6:
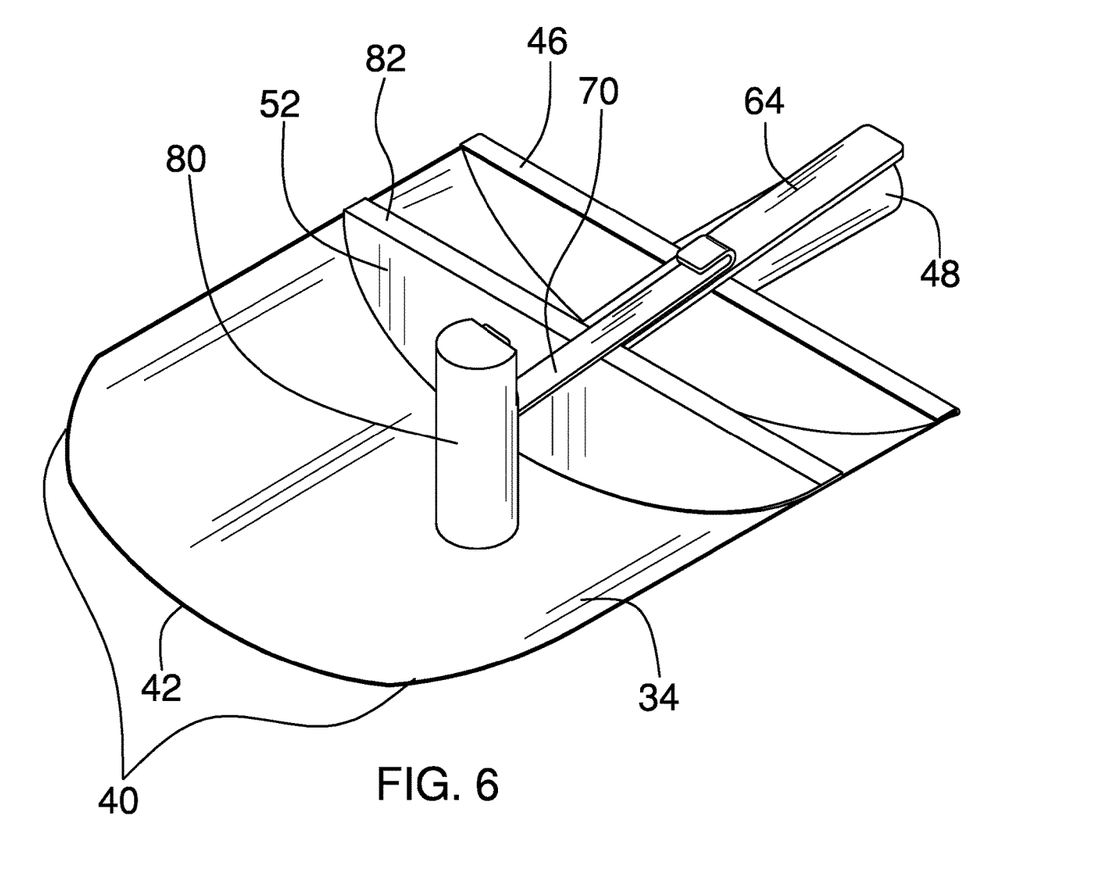
FIG. 6 is an in-use view of an embodiment of the disclosure.
Figure 7:
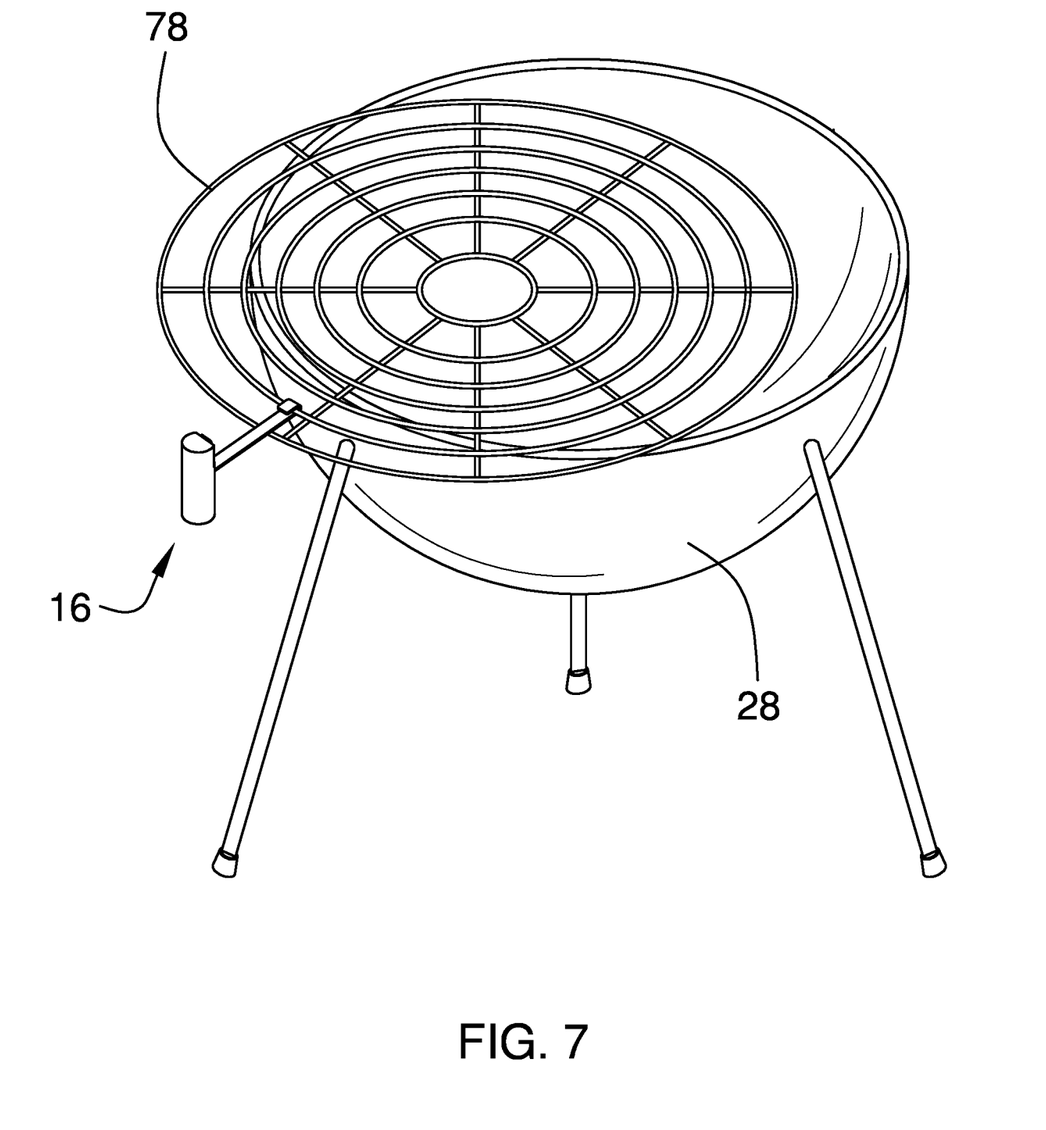
FIG. 7 is an in-use view of an embodiment of the disclosure.
Figure 8:
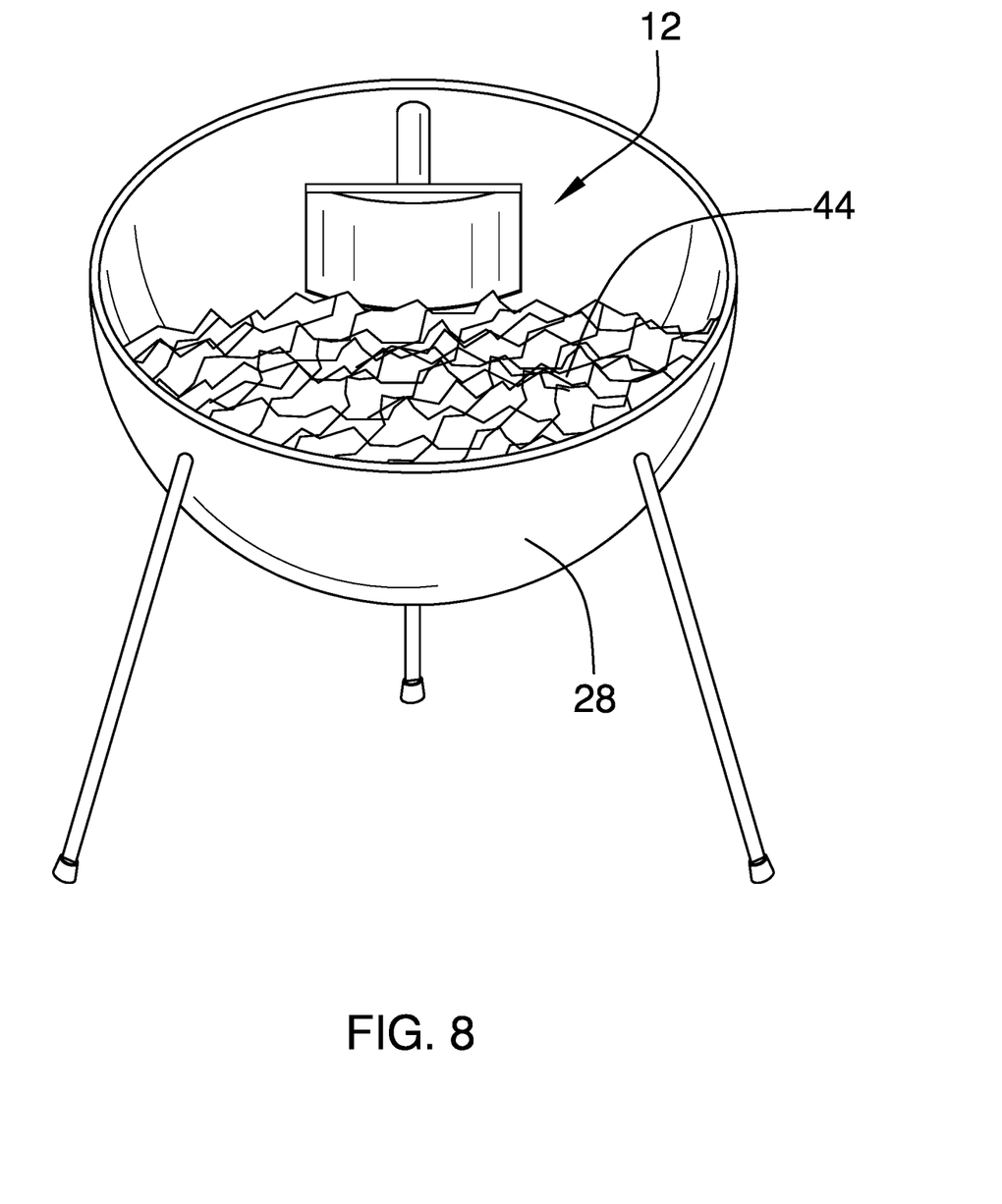
FIG. 8 is an in-use view of an embodiment of the disclosure.
Figure 9:
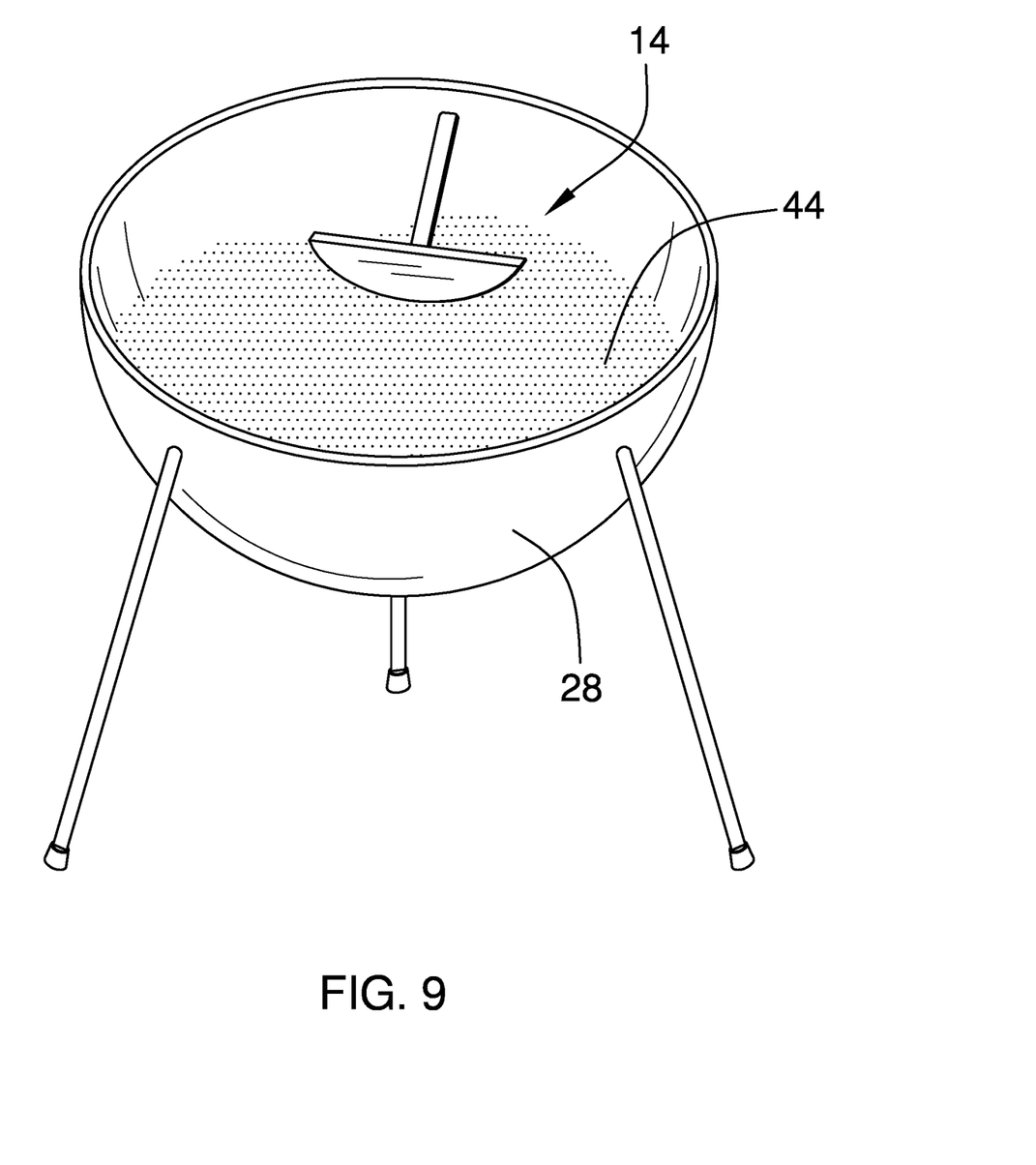
FIG. 9 is an in-use view of an embodiment of the disclosure.
Figure 10:
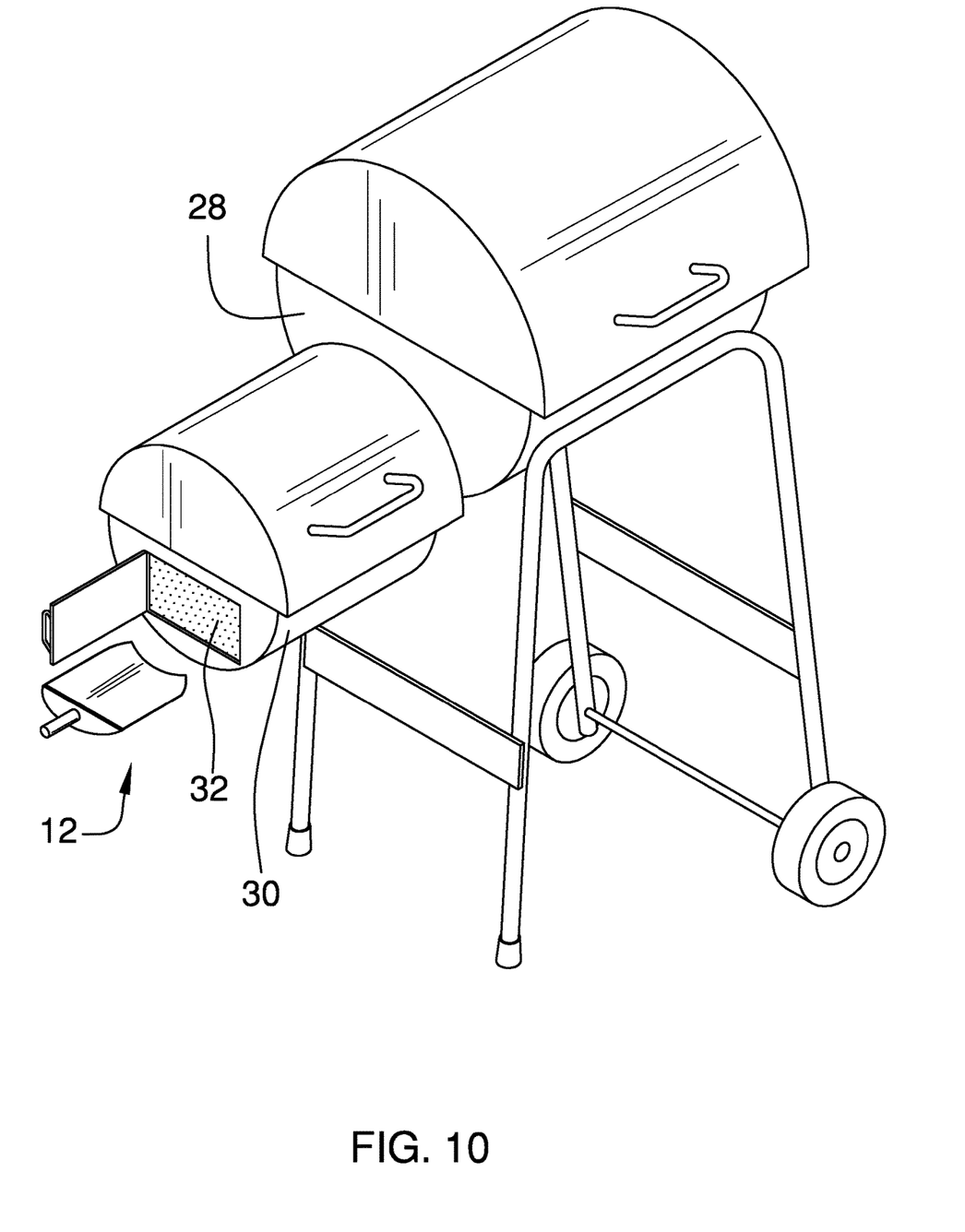
FIG. 10 is an in-use view of an embodiment of the disclosure.

With reference now to the drawings, and in particular to FIGS. 1 through 10 thereof, a new grill cleaning device embodying the principles and concepts of an embodiment of the disclosure and generally designated by the reference numeral 10 will be described.

As best illustrated in FIGS. 1 through 10, the grill cleaning tool assembly 10 generally comprises a curved ash scoop apparatus 12, a curved ash scraper apparatus 14, and a grill hook apparatus 16. The curved ash scoop apparatus 12 comprises a scoop back 18 having a scoop back front side 20, a scoop back back side 22, a scoop back top edge 24, and a scoop back bottom edge 26. The scoop back bottom edge 26 is arcuate and is configured to conform to the contour of a rounded grill 28 or smoker 30. The curved ash scoop apparatus 12 is dimensioned to fit through a smoker door aperture 32 of the smoker. The scoop back bottom edge 26 may have an edge lip portion 33 extending perpendicularly from the scoop back front side 20.

A scoop body 34 is coupled to the scoop back 18. The scoop body 34 extends from the scoop back bottom edge 26 perpendicular to the scoop back front side 20 and is supported by the edge lip portion 33. The scoop body 34 has a pair of scoop body lateral edges 36 extending perpendicularly from the scoop back top edge 24. The scoop body 34 thus follows the entire contour of the scoop back bottom edge 26. The scoop body 34 has a scoop front edge 38 that may include a pair of angled drop portions 40 extending down from the pair of scoop body lateral edges 36 and a medial leading portion 42 extending between the pair of angled drop portions 40. The scoop body 34 is configured to collect a deposit of ash and charcoal 44 as it is pushed along the bottom of the rounded grill 28 or smoker 30.

A scoop lip 46 may be coupled to the scoop back 18 and the scoop body 34. The scoop lip 46 is coupled to the scoop back top edge 24 and extends perpendicularly from the scoop back front side 20. The scoop lip 46 prevents the ash and charcoal 44 from spilling over the scoop back 18.

A scoop handle 48 is coupled to the scoop back 18. The scoop handle 48 may be cylindrical and extends perpendicularly from the scoop back back side 22. A scoop handle attachment hardware 50 may extend through the scoop back 18 to the scoop back front side 20.

The curved ash scraper apparatus 14 comprises a scraper blade 52 having a blade front side 54, a blade back side 56, a blade top edge 58, and a blade bottom edge 60. The blade bottom edge 60 is arcuate and conforms to the contour of the scoop back bottom edge 26. A scraper lip 62 may be coupled to the scraper blade 52. The scraper lip 62 is coupled to the blade top edge 58 and extending perpendicularly from the blade back side 56.

A scraper handle 64 is coupled to the scraper blade 52. The scraper handle 64 is coupled to the blade back side 56. The scraper handle 64 may have an attachment portion 66 coupled the blade back side 56 and an extension portion 68 extending from the attachment portion 66 adjacent the scraper lip 62. The extension portion 68 forms an angle with the attachment portion 66 between 90° and 120°. The scraper handle 64 may be substantially flat so as to rest on top of the scoop lip 46 with the scraper blade 52 nested within the scoop body 34.

The grill hook apparatus 16 comprises a hook body 70 having a distal hooked portion 72, a medial stem portion 74, and a proximal rear portion 76. The distal hooked portion 72 is configured to selectively engage a grate 78 of the grill or smoker. The proximal rear portion 76 may extend perpendicularly from the medial stem portion 74. A hook handle 80 is coupled to the hook body 70. The hook handle 80 may be cylindrical and may have a planar notched section 82. The proximal rear portion 76 of the hook body is coupled to the planar notched section 82 such that the medial stem portion 74 extends medially and perpendicularly from the hook handle 80.

In use, the grill hook apparatus 16 is used to engage the grate 78 and remove it from the grill 28 or smoker 30. The curved ash scraper apparatus 14 is then used to push the ash and charcoal 44 with the scraper blade 52. The curved ash scoop apparatus 12 is then used to collect the ash and charcoal 44 within the scoop body 34 for removal.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A grill cleaning tool assembly comprising:
   a curved ash scoop apparatus, the curved ash scoop apparatus comprising:
      a scoop back, the scoop back having a scoop back front side, a scoop back back side, a scoop back top edge, and a scoop back bottom edge, the scoop back bottom edge being arcuate and being configured to conform to the contour of a rounded grill or smoker;
      a scoop body coupled to the scoop back, the scoop body extending from the scoop back bottom edge perpendicular to the scoop back front side; and
      a scoop handle coupled to the scoop back, the scoop handle being coupled to the scoop back side; and
   a curved ash scraper apparatus, the curved ash scraper apparatus comprising:
      a scraper blade, the scraper blade having a blade front side, a blade back side, a blade top edge, and a blade bottom edge, the blade bottom edge being arcuate and conforming to the contour of the scoop back bottom edge; and
      a scraper handle coupled to the scraper blade, the scraper handle being coupled to the blade back side.

2. The grill cleaning tool assembly of claim 1 further comprising a grill hook apparatus, the grill hook apparatus comprising:
   a hook body, the hook body having a distal hooked portion, a medial stem portion, and a proximal rear portion, the distal hooked portion being configured to selectively engage a grate of the grill or smoker; and
   a hook handle coupled to the hook body, the hook handle being coupled to the proximal rear portion.

3. The grill cleaning tool assembly of claim 2 further comprising the proximal rear portion extending perpendicularly from the medial stem portion.

4. The grill cleaning tool assembly of claim 3 further comprising the hook handle being cylindrical and having a planar notched section, the proximal rear portion of the hook body being coupled to the planar notched section.

5. The grill cleaning tool assembly of claim 1 further comprising the curved ash scoop apparatus having a scoop lip coupled to the scoop back and the scoop body, the scoop lip being coupled to the scoop back top edge and extending perpendicularly from the scoop back front side.

6. The grill cleaning tool assembly of claim 1 further comprising the scoop body having a pair of scoop body lateral edges extending perpendicularly from the scoop back top edge.

7. The grill cleaning tool assembly of claim 6 further comprising the scoop body having a scoop front edge including a pair of angled drop portions extending down from the pair of scoop body lateral edges and a medial leading portion extending between the pair of angled drop portions.

8. The grill cleaning tool assembly of claim 1 further comprising the scoop handle being cylindrical and extending perpendicularly from the scoop back back side.

9. The grill cleaning tool assembly of claim 1 further comprising the curved ash scraper apparatus having a scraper lip coupled to the scraper blade, the scraper lip being coupled to the blade top edge and extending perpendicularly from the blade back side.

10. The grill cleaning tool assembly of claim 9 further comprising the scraper handle having an attachment portion coupled the blade back side and an extension portion extending from the attachment portion adjacent the scraper lip, the extension portion forming an angle with the attachment portion between 90° and 120°.

11. A grill cleaning tool assembly comprising:
- a curved ash scoop apparatus, the curved ash scoop apparatus comprising:
  - a scoop back, the scoop back having a scoop back front side, a scoop back back side, a scoop back top edge, and a scoop back bottom edge, the scoop back bottom edge being arcuate and being configured to conform to the contour of a rounded grill or smoker;
  - a scoop body coupled to the scoop back, the scoop body extending from the scoop back bottom edge perpendicular to the scoop back front side, the scoop body having a pair of scoop body lateral edges extending perpendicularly from the scoop back top edge, the scoop body having a scoop front edge including a pair of angled drop portions extending down from the pair of scoop body lateral edges and a medial leading portion extending between the pair of angled drop portions;
  - a scoop lip coupled to the scoop back and the scoop body, the scoop lip being coupled to the scoop back top edge and extending perpendicularly from the scoop back front side; and
  - a scoop handle coupled to the scoop back, the scoop handle being cylindrical and extending perpendicularly from the scoop back side;
- a curved ash scraper apparatus, the curved ash scraper apparatus comprising:
  - a scraper blade, the scraper blade having a blade front side, a blade back side, a blade top edge, and a blade bottom edge, the blade bottom edge being arcuate and conforming to the contour of the scoop back bottom edge;
  - a scraper lip coupled to the scraper blade, the scraper lip being coupled to the blade top edge and extending perpendicularly from the blade back side; and
  - a scraper handle coupled to the scraper blade, the scraper handle being coupled to the blade back side, the scraper handle having an attachment portion coupled the blade back side and an extension portion extending from the attachment portion adjacent the scraper lip, the extension portion forming an angle with the attachment portion between 90° and 120°; and
- a grill hook apparatus, the grill hook apparatus comprising:
  - a hook body, the hook body having a distal hooked portion, a medial stem portion, and a proximal rear portion, the distal hooked portion being configured to selectively engage a grate of the grill or smoker, the proximal rear portion extending perpendicularly from the medial stem portion; and
  - a hook handle coupled to the hook body, the hook handle being cylindrical and having a planar notched section, the proximal rear portion of the hook body being coupled to the planar notched section.

\* \* \* \* \*